(12) United States Patent
Lin (10) Patent No.: US 9,371,848 B2
(45) Date of Patent: Jun. 21, 2016

(54) BUCKLING MECHANISM AND ARTICLE HAVING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventor: Chun Yen Lin, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 189 days.

(21) Appl. No.: 14/448,233

(22) Filed: Jul. 31, 2014

(65) Prior Publication Data
US 2015/0204367 A1    Jul. 23, 2015

(30) Foreign Application Priority Data
Jan. 22, 2014  (CN) .......................... 2014 1 0031092

(51) Int. Cl.
*F16B 2/10*  (2006.01)

(52) U.S. Cl.
CPC ............... *F16B 2/10* (2013.01); *Y10T 403/602* (2015.01)

(58) Field of Classification Search
CPC .......... F16B 5/06; F16B 21/073; F16B 21/09; F16B 2/10; H05K 7/12; H05K 7/1405; G06F 1/1679
See application file for complete search history.

(56) References Cited

U.S. PATENT DOCUMENTS

| | | | | |
|---|---|---|---|---|
| 4,799,718 A * | 1/1989 | Ing | ........................ | E05B 63/127 292/36 |
| 5,217,262 A * | 6/1993 | Kurosaki | .............. | E05C 19/022 292/6 |
| 5,984,381 A * | 11/1999 | Yamagishi | ............ | E05C 19/022 267/158 |
| 6,598,896 B1 * | 7/2003 | Hyslop | ..................... | B60P 3/10 280/414.1 |
| 7,108,298 B2 * | 9/2006 | Huet | ..................... | E05C 19/022 292/19 |
| 7,393,026 B2 * | 7/2008 | Ikeda | ................... | H01R 13/627 292/341.15 |
| 7,510,345 B2 * | 3/2009 | Kosh | ................. | A44B 11/2592 292/197 |
| 8,297,872 B2 * | 10/2012 | Wei | ....................... | F16B 21/073 403/321 |
| 8,425,140 B2 * | 4/2013 | Wei | ....................... | F16B 5/0657 403/321 |

FOREIGN PATENT DOCUMENTS

TW            I403248 B1      7/2013

* cited by examiner

*Primary Examiner* — Daniel Wiley
(74) *Attorney, Agent, or Firm* — Li & Cai Intellectual Property (USA) Office (57) ABSTRACT

A buckling mechanism includes a first member, a second member and a locking assembly. The first member has a pair of locking-arm guiding portions formed thereon and gradually approaching each other inward from an outside of the first member. The second member has a latching member. The locking assembly has a connection element, a first resilient element, a interfering member and a second resilient element. The connection element has a main body disposed on the first member, and a pair of flexible locking arms. The locking arms are slidably disposed on the first member along the pair of locking-arm guiding portions respectively. The connection element is pushed by the latching member to a locked position from an unlocked position. The pair of locking arms contracts along the two mutually approaching locking-arm guiding portions, and the interfering member blocks the sliding blocker.

19 Claims, 13 Drawing Sheets

BUCKLING MECHANISM AND ARTICLE HAVING THE SAME

BACKGROUND OF THE INVENTION

1. Field of the Invention

The present invention relates to a buckling mechanism and an article having the same; in particular, to a buckling mechanism adaptable to an article for buckling two objects.

2. Description of Related Art

Buckling mechanisms are popular for fastening two removable objects. Designs of buckling mechanisms have progressed toward screw-less and ergonomic features. Screw-less designs simplifies complicated assembly processes and does away with tools during disassembly.

TIPO Publication TW I403248 "Fastening Device and an Object Having the Same" discloses a screw-less fastening device. Said screw-less fastening device allows quick assembly and disassembly of a first object and a second object without using screws.

However, the above-mentioned fastening device still requires a copious amount of units. The first object is required to have a first hook and two retaining boards. The second object is required to have two second hooks. The two retaining boards are perpendicularly connected to the first object. Moreover, in order to fix the two second hooks, the second object also needs a plurality of fixing boards. Overall, the assembly process is still cumbersome and the assembled article occupies a definite amount of volume. Additionally, the adaptability of said fastening device is limited and not easily modified to suit the needs of different articles.

SUMMARY OF THE INVENTION

The object of the present disclosure is to provide a buckling mechanism having a reduced quantity of units, simplified assembly process and reduced overall volume.

Moreover, an embodiment of the present disclosure further provides an elastic latch design having a position-limiting ability, to prevent excessive force during operation from causing failure to the structure. Additionally, by removing the restricting condition of position-limiting, the engaged structure can be automatically withdrawn.

In order to achieve the aforementioned objects, the present disclosure provides a buckling mechanism including a first member, a second member and a locking assembly. The first member has a pair of locking-arm guiding portions gradually approaching each other from an exterior edge of the first member inward. The second member has a latching member. The locking assembly includes a connection element, a first resilient element, a interfering member and a second resilient element. The connection element has a main body disposed slidably along a line on the first member, and a pair of locking arms which are flexible and connected to the main body. The main body is formed with a positioning portion. The pair of locking arms is slidably disposed on the first member along the pair of locking-arm guiding portions. When the latching member of the second member pushes the connection element from an unlocked position to a locked position, the locking-arm guiding portions which approach each other guides the locking arms are to contract for retaining the latching member. The first resilient element provides a spring force to the main body to maintain the connection element at the unlocked position under normal conditions. The interfering member blocks the positioning portion of the connection element such that the connection element is restricted at the locking position. The second resilient element pushes the interfering member to a position for blocking the connection element.

Additionally, the present disclosure also provides an article having a buckling mechanism, including a first member, a second member, and a locking assembly. The first member has a pair of locking-arm guiding portions gradually approaching each other from an exterior edge of the first member inward. The second member has a latching member. The locking assembly includes a connection element, a first resilient element, a interfering member and a second resilient element. The connection element has a main body disposed slidably along a line on the first member, and a pair of locking arms which are flexible and connected to the main body. The main body is formed with a positioning portion. The pair of locking arms is slidably disposed on the first member along the pair of locking-arm guiding portions. When the latching member of the second member pushes the connection element from an unlocked position to a locked position, the locking-arm guiding portions which approach each other guides the locking arms are to contract for retaining the latching member. The first resilient element provides a spring force to the main body to maintain the connection element at the unlocked position under normal conditions. The interfering member blocks the positioning portion of the connection element such that the connection element is restricted at the locking position. The second resilient element pushes the interfering member to a position for blocking the connection element.

Moreover, according to another embodiment of the present disclosure, the first member further includes a path guiding portion, an guide protrusion protrudes from the main body of the connection element, and the guide protrusion is slidably disposed in the path guiding portion.

The present disclosure has the following advantages. Upon releasing the connection element from the locked position, the second member is automatically withdrawn from the first member. The user does not need to manually withdraw the second member. The buckling mechanism has an ability for automatic ejection. The quantity of components is low and is sufficient to achieve the effects of locking and automatic ejection, and the structure is screw-less, saving the production cost. The assembly process is simplified.

In order to further the understanding regarding the present disclosure, the following embodiments are provided along with illustrations to facilitate the disclosure of the present disclosure.

BRIEF DESCRIPTION OF THE DRAWINGS

FIG. 5A to FIG. 5C show a buckling mechanism going from an unlocked state into a locked state;

FIG. 6A to FIG. 6C show a buckling mechanism going from a locked state into an unlocked state;

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. Besides, in the following description, when it comes to the number or the like, unless specifically described, the instant disclosure is not limited to the number mentioned. Throughout the present specification, expression of relative position such as "top", "bottom", "left", "right", "front", "rear" etc, are used solely for convenience and clarity as oriented in the drawings. They are in no way intended to be limited as to the orientation of use of the instant disclosure described.

First Embodiment

Figure 1:
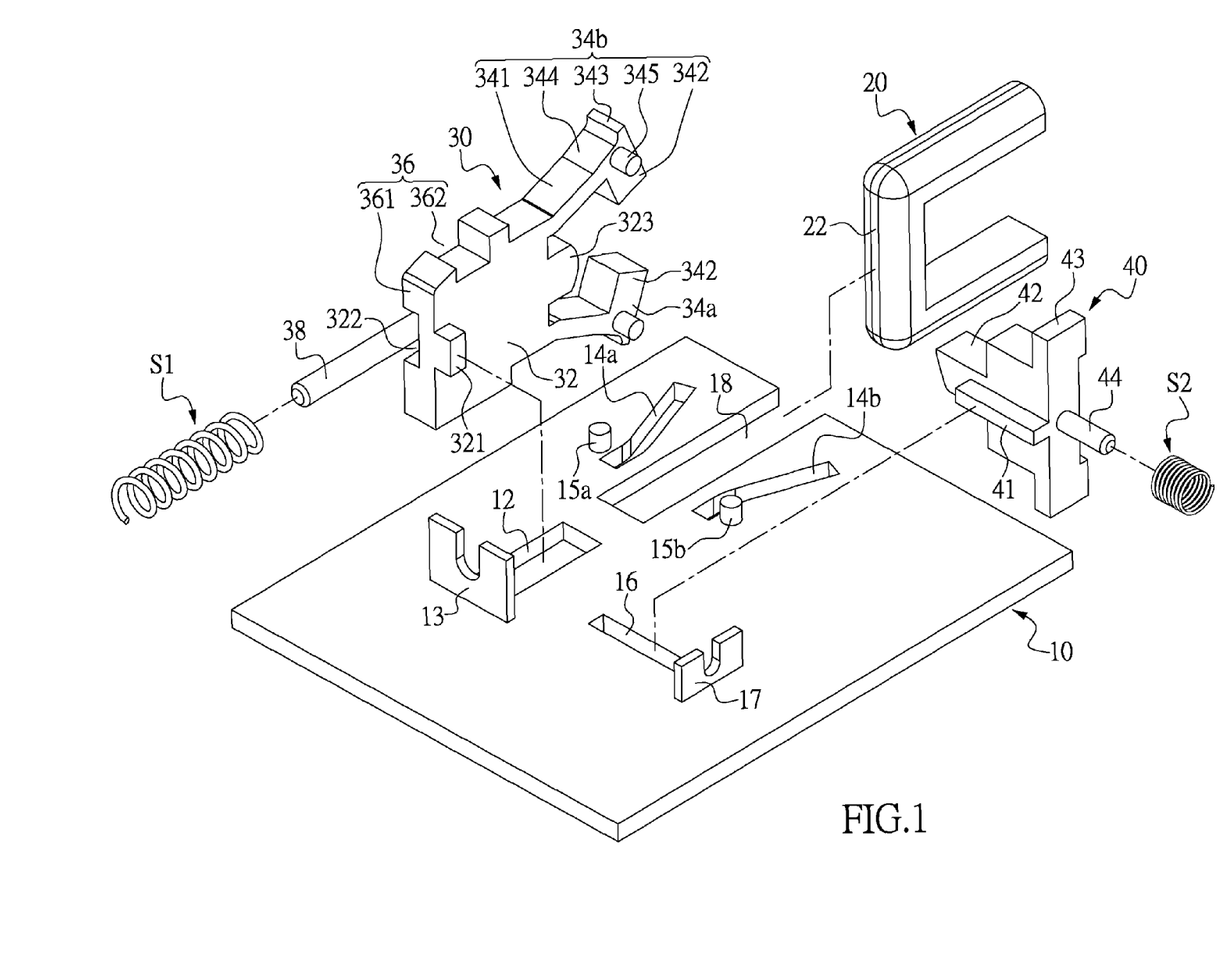
FIG. 1 shows an exploded view of a buckling mechanism according to the present disclosure.
Figure 2:
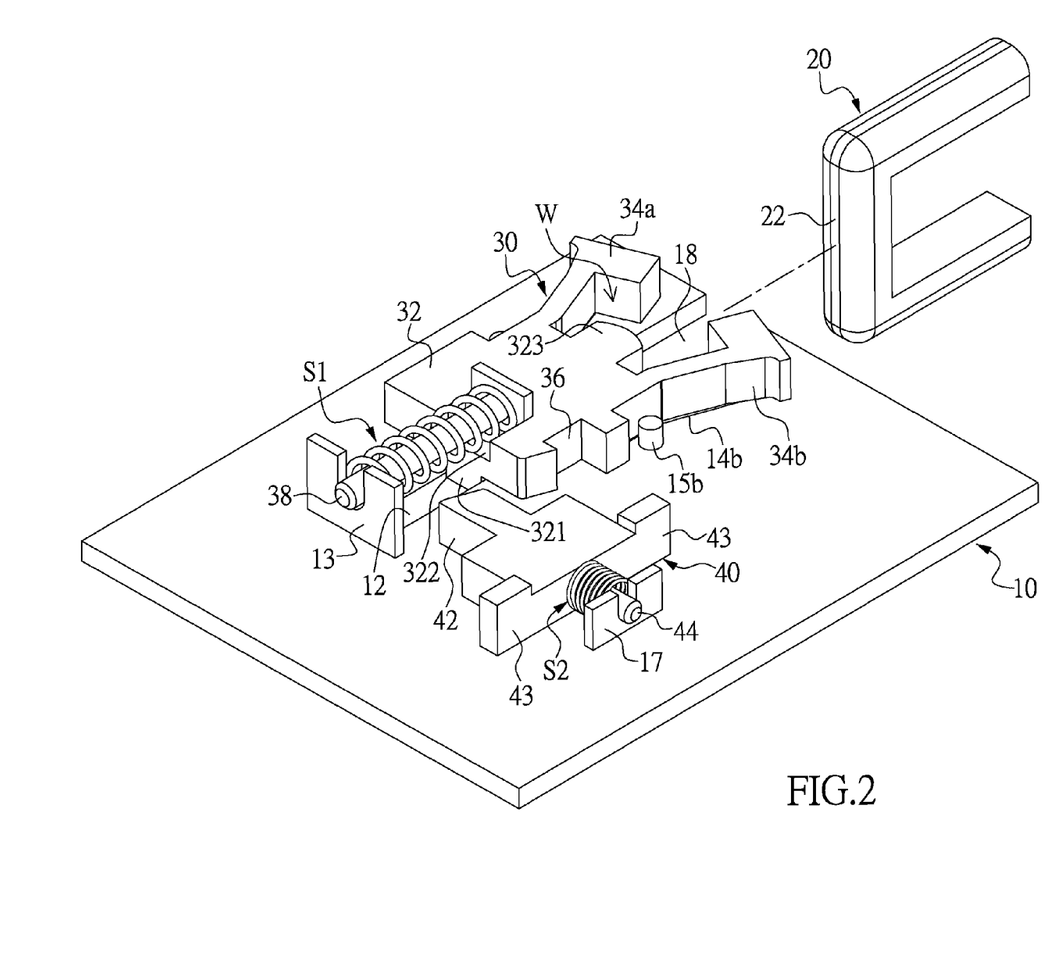
FIG. 2 shows a perspective view of an assembled buckling mechanism in an unlocked state according to the present disclosure.

FIG. 1 shows an exploded view of a buckling mechanism according to the present disclosure, and FIG. 2 shows a perspective view of an assembled buckling mechanism in an unlocked state according to the present disclosure. The present disclosure provides a buckling mechanism including a first member 10, a second member 20 and a locking assembly. The first member 10 has a path guiding portion 12, a pair of locking-arm guiding portions 14a, 14b gradually approaching each other from an exterior edge of the first member 10 inward. The second member 20 has a latching member 22.

The locking assembly includes a connection element 30, a first resilient element S1, an interfering member 40 and a second resilient element S2. The connection element 30 has a main body 32 disposed slidably along a path (e.g. a straight line) on the first member 10, and a pair of locking arms 34a, 34b which are flexible and connected to the main body 32. The main body 32 is formed with a positioning portion 36. The two locking arms 34a, 34b are slidably disposed on the first member along the two locking-arm guiding portions 14a, 14b, respectively.

Figure 3:
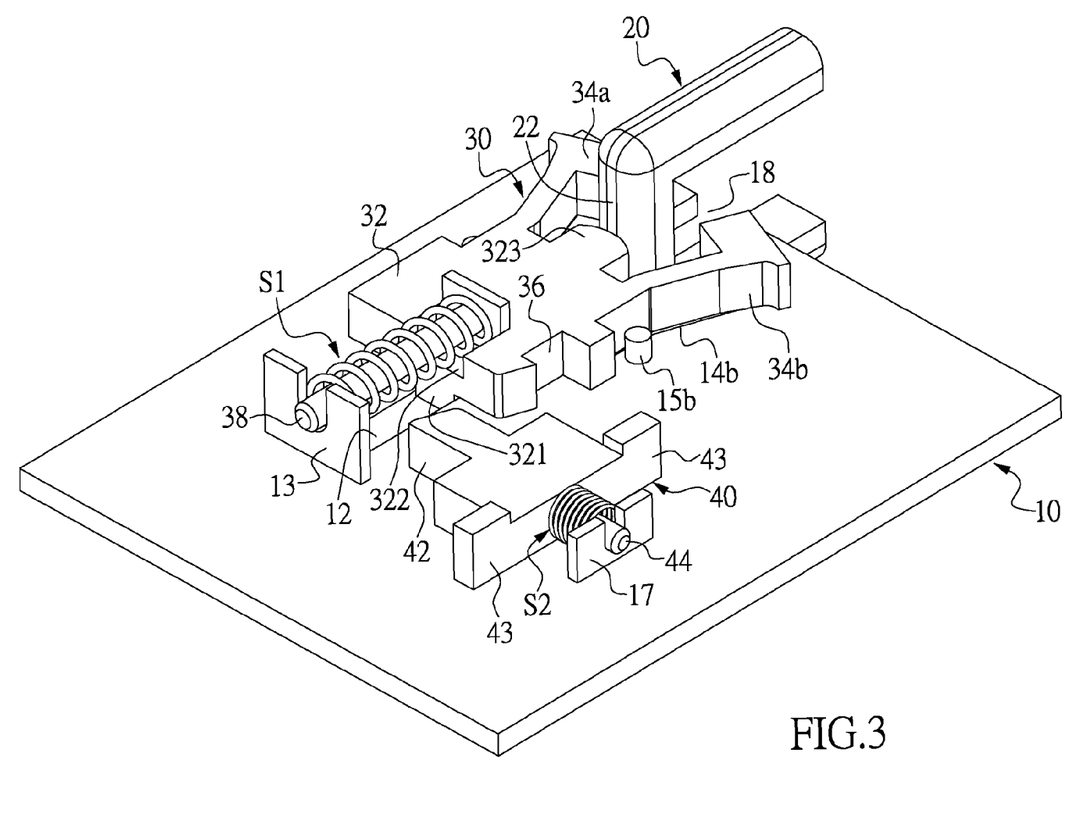
FIG. 3 shows a perspective view of a second member abutting a first member of a buckling mechanism according to the present disclosure.

Simply speaking, regarding the buckling mechanism of the present disclosure, the second member 20 is locked to the first member 10 by the locking assembly. As shown in FIG. 3, when the latching member 22 of the second member 20 pushes the main body 32 from outside of the first member 10, the connection element 30 moves from an unlocked position proximal to the pair of locking-arm guiding portions 14a, 14b (refer to FIG. 2) to a locked position distal from the pair of locking-arm guiding portions 14a, 14b (refer to FIG. 4). In concert with the pushing process of the latching member 22, the pair of locking arms 34a, 34b is guided by the mutually approaching locking-arm guiding portions 14a, 14b to contract for retaining the latching member 22. The first resilient element S1 provides a spring force on the main body 32 to drive the connection element 30 to the unlocked position under normal conditions. The interfering member 40 engages the positioning portion 36 of the connection element 30 such that the connection element 30 is retained at the locked position. The second resilient element S2 is configured to push the interfering member 40 to a position for engaging the connection element 30 under normal conditions. The following describes the components in detail.

Referring to FIG. 1, the first member 10 of the present embodiment is board-shaped, and is preferably a metal board made by stamping but is not limited thereto (e.g. the first member 10 can also be a plastic board). The path guiding portion 12 and the locking-arm guiding portions 14a, 14b are slots passing through the first member 10, but are not limited thereto and can be recessed grooves instead. The underside of the main body 32 of the connection element 30 has an guide protrusion 321. The guide protrusion 321 of the present embodiment is a protruding block slidably disposed in the path guiding portion 12. The two locking arms 34a, 34b each have a guide protrusion 345 protruding therefrom. The two guide protrusions 345 are respectively slidably disposed in the two locking-arm guiding portions 14a, 14b. The first member 10 is formed with a interfering member guiding slot 16 for cooperating with the interfering member 40. The underside of the interfering member 40 is formed with a strip-shaped guiding rail 41 accommodated in the interfering member guiding slot 16 for linear motion. The interfering member guiding slot 16 of the present embodiment is also a slot passing through the first member 10, but is not limited thereto and can be a recessed groove. Additionally, to facilitate the entry of the second member 20 to the locked position, the first member 10 can be formed with a latch guiding slot 18. One end of the latch guiding slot 18 opens at a side edge of the first member 10. The latch guiding slot 18 is arranged between the two locking-arm guiding portions 14a, 14b.

Figure 4:
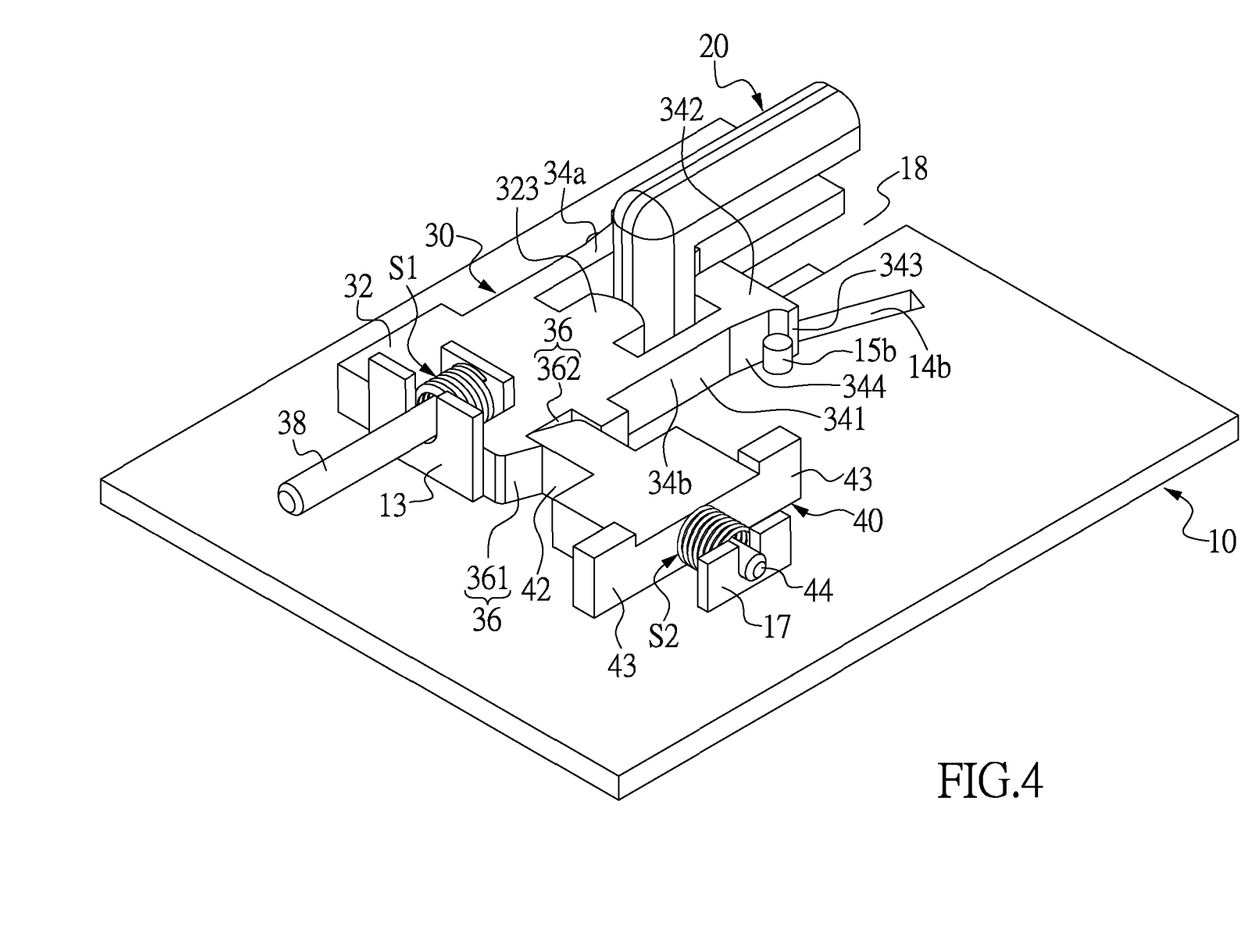
FIG. 4 shows a perspective view of an assembled buckling mechanism in a locked state according to the present disclosure.

The main body 32 of the connection element 30 is substantially rectangularly shaped. The two locking arms 34a, 34b are each L-shaped and connected to an end of the main body 32. Each of the locking arms 34a, 34b includes an arm portion 341 and a hooking portion 342 bent from the free end of the arm portion 341. As shown in FIG. 2, the pair of L-shaped locking arms 34a, 34b and the main body 32 define a retaining space W. The arm portions 341 are flexible such that the hooking portions 342 can open or contract. As shown in FIG. 2, when the two locking arms 34a, 34b open outward, the connection element 30 is Y-shaped. As shown in FIG. 4, when the locking arms 34a, 34b contracts, the second member 20 is retained in the retained space W.

Referring to FIG. 3, the main body 32 of the present embodiment is further formed with an pushing block 323 extending into the retaining space W and is arranged between the two locking arms 34a, 34b. The pushing block 323 can reduce the movement margin of the latching member 22 of the second member 20, such that the latching member 22 is restricted between the pushing block 323, the arm portions 341 and the hooking portions 342.

Referring to FIG. 1 and FIG. 4, in order for the two locking arms 34a, 34b to be more stable when in contraction, the buckling mechanism of the present embodiment further includes two constricting columns 15a, 15b disposed on the first member 10 at the outer sides of the two locking-arm guiding portions 14a, 14b respectively. Each of the locking arms 34a, 34b includes an stopping member 343 formed on the outer side of the hooking portion 342, and an oblique surface 344 extending from the stopping member 343 to the arm portion 341. When the main body 32 is pushed by the second member 20 to the locked position, the two constricting columns 15a, 15b respectively slide along the oblique surfaces 344 and abut the stopping members 343. When the two locking arms 34a, 34b contracts, the guide protrusions 345 are respectively restricted in the locking-arm guiding portions 14a, 14b, and the constricting columns 15a, 15b respectively blocks the outer faces of the locking arms 34a, 34b. By this configuration, the locking arms 34a, 34b are more stable and less easily damaged by external forces.

The connection element 30 includes a first guiding column 38 parallel to the first member. The guiding column 38 extends from the main body 32 away from the locking arms 34a, 34b. The first resilient element S1 of the present embodiment is a compression spring sleeving the first guiding column 38. The first member 10 includes a first limiting plate 13. The first limiting plate 13 is overall U-shaped and integrally formed as one body with the first member 10, preferably by stamping the first member 10 made of metal. The first guiding column 38 is slidably disposed at the first limiting plate 13. The two ends of the first resilient element S1 respectively abut the main body 32 and the first limiting plate 13. Preferably, the main body 32 has an mounting groove 322 and the first guiding column 38 extends from the mounting groove 322. The mounting groove 322 can accommodate the first resilient element S1. An advantage of the mounting groove lies in that the first resilient element S1 is completely accommodated within the mounting groove 322 when compressed and does not take up any additional space. The connection element 30 abuts the first limiting plate 13. By this configuration, the overall length of the buckling mechanism is reduced.

Referring to FIG. 1, the positioning portion 36 of the main body 32 includes an inclined-face protrusion 361 and a positioning groove 362 adjacent to the inclined-face protrusion 361. The interfering member 40 has a blocking portion 42. The blocking portion 42 has an inclined face for cooperation with the inclined-face protrusion 361. When the main body 32 is at the locking position (as shown in FIG. 4), the blocking portion 42 is inserted into the positioning groove 362. By this configuration, the connection element 30 is retained such that the second member 20 is fixed to the first member 10. The following describes the locking process in detail.

Figure 5A:
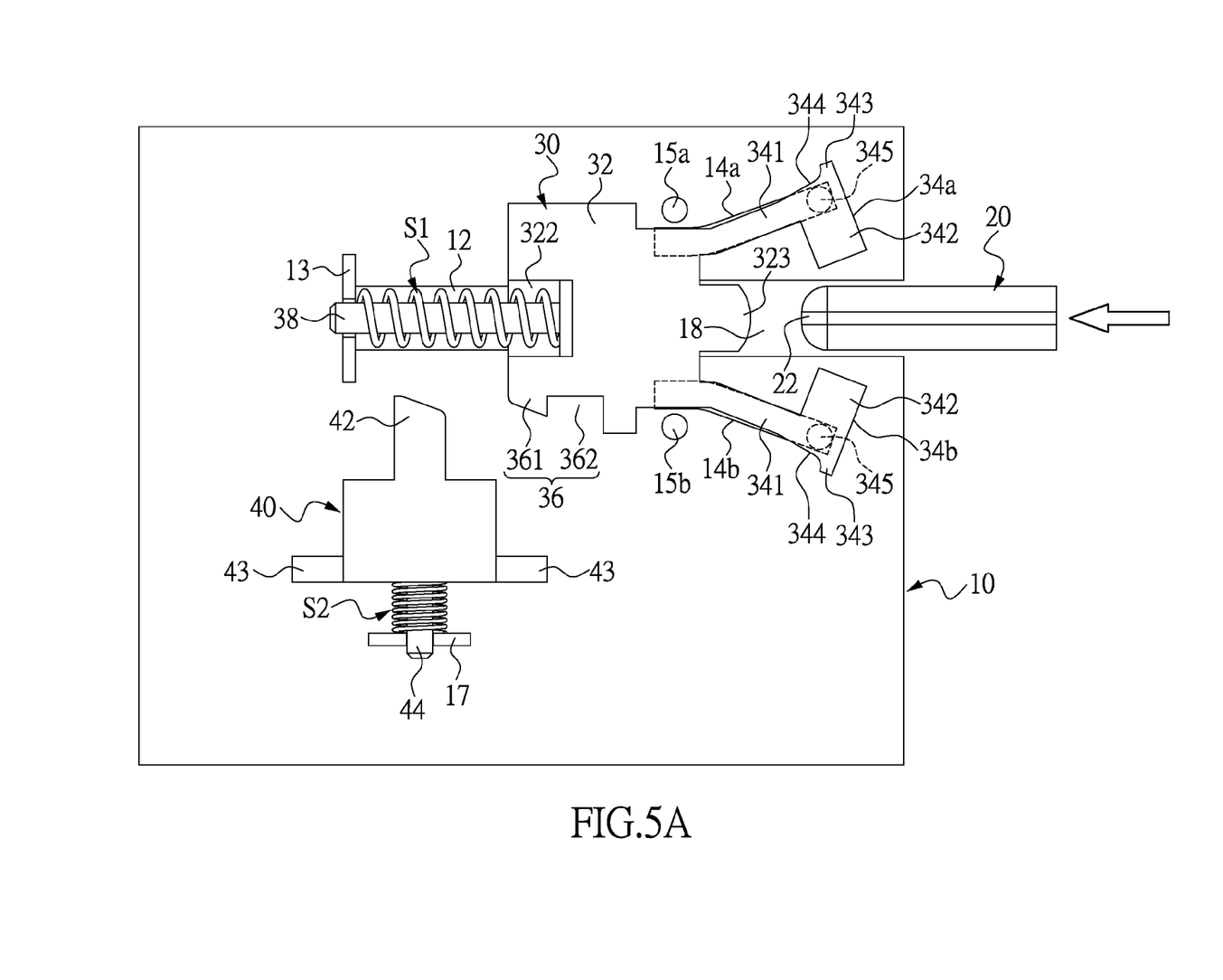
Figure 5B:
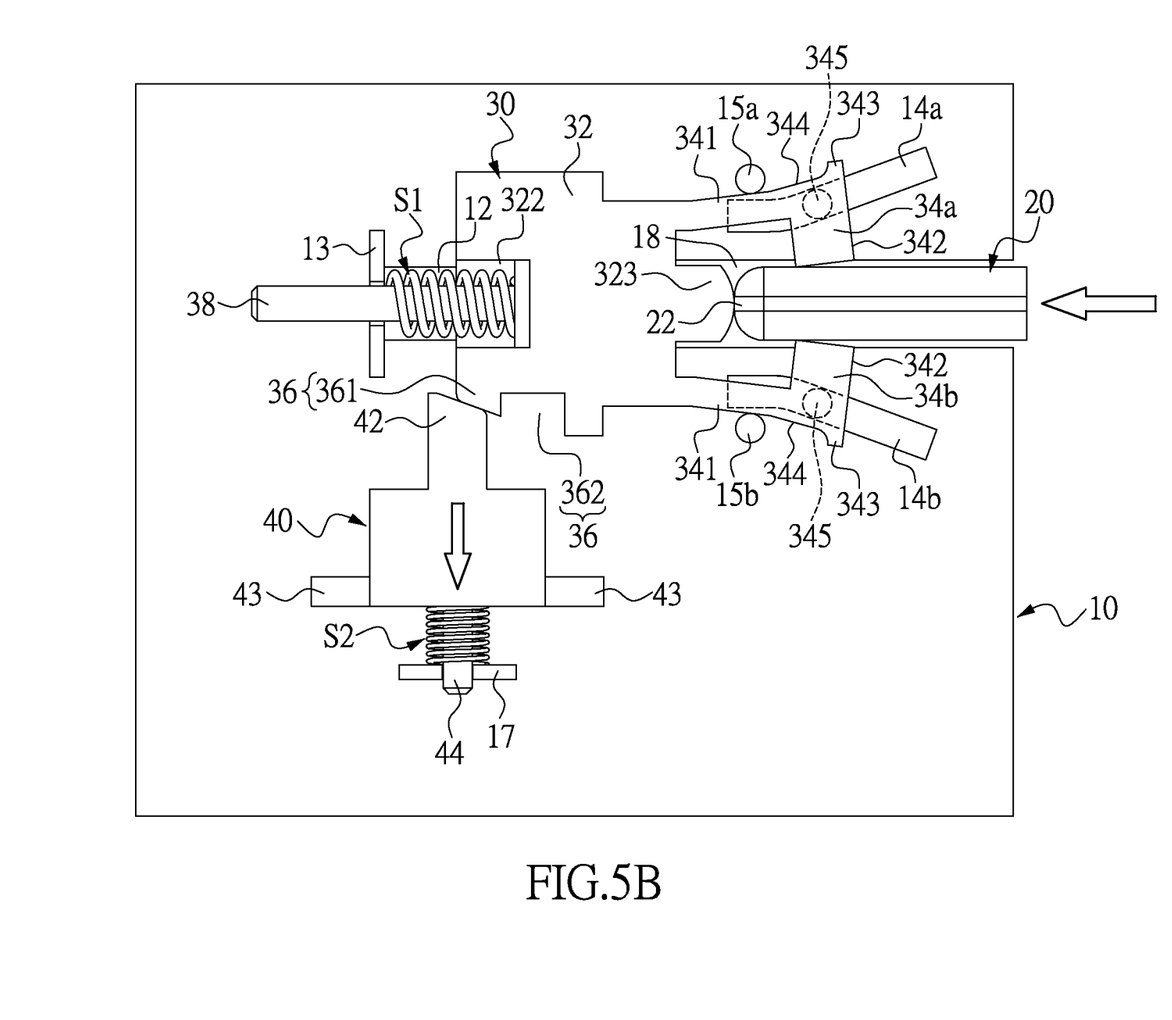
Figure 5C:
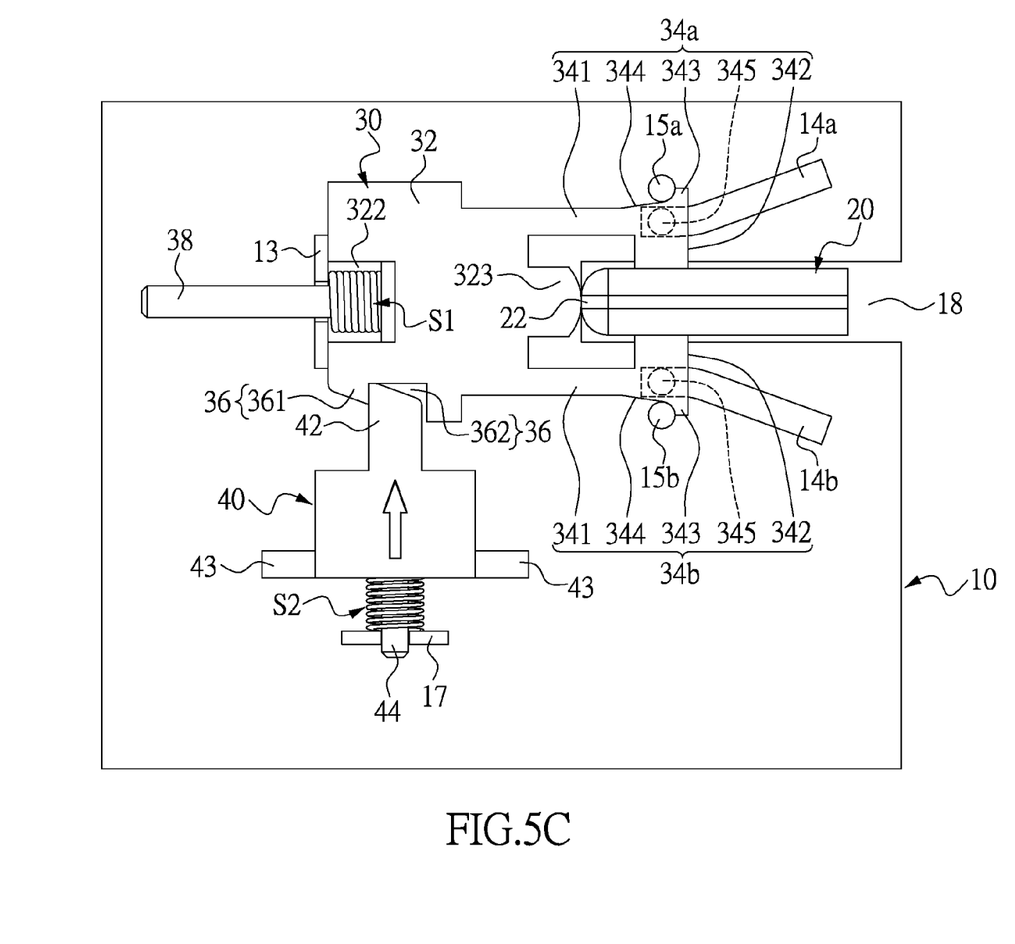

The interfering member 40 has a second guiding column 44. The second resilient element S2 is a compression spring sleeving the second guiding column 44. The first member 10 includes a second limiting plate 17. The second limiting plate 17 is overall U-shaped. The second guiding column 44 is slidably disposed at the second limiting plate 17. The two ends of the second resilient element S2 respectively abut the interfering member 40 and the second limiting plate 17. The second guiding column 44 guides the movement of the interfering member 40. The interfering member 40 of the present embodiment has a pair of holding portions 43 protruding from two sides thereof, for the user to pull the interfering member 40 backwards and away from the positioning portion 36 of the main body 32, such that the connection element 30 can be unlocked and restored to the unlocked position through the force provided by the first resilient element S1. The quantity of the holding portion 43 can be at least one. The following describes the unlocking process in detail FIG. 5A to FIG. 5C show a buckling mechanism going from an unlocked state into a locked state. As shown in FIG. 5A, the buckling mechanism is in an unlocked state, the connection element 30 is at the unlocked position, and the second member 20 moves from the outer side of the first member toward the connection element 30 along the latch guiding slot 18.

As shown in FIG. 5B, the second member 20 moves toward the connection element 30 and abuts the pushing block 323 of the main body 32, and the connection element 30 is pushed backward. In the process, the two locking arms 34a, 34b contract as the two guide protrusions 345 respectively moves along the two locking-arm guiding portions 14a, 14b. The first guiding column 38 moves along the first limiting plate 13, and the first resilient element stores elastic energy due to being compressed. Additionally, the positioning portion 36 moves backward and pushes the blocking portion 42 of the interfering member 40. The second resilient element S2 also scores elastic energy due to being compressed.

As shown in FIG. 5C, the connection element 30 is pushed to the end and contacts the first limiting plate 13 and positioned at the locked position. The two guide protrusions 345 of the respective two locking arms 34a, 34b moves to the ends of the locking-arm guiding portions 14a, 14b, and the locking arms 34a, 34b contract such that the two arm portions 341 are substantially parallel. The second member 20 is blocked by the two hooking portions 342 and cannot be withdrawn. At the same time, the two constricting columns 15a, 15b respectively abut the oblique surfaces 344 and the stopping members 343 of the locking arms 34a, 34b, and the two locking arms 34a, 34b cannot open outward. Additionally, the blocking portion 42 of the interfering member 40 slides past the inclined-face protrusion 361, and is pushed into the positioning groove 362 by the second resilient element S2. By this configuration, the connection element 30 is fixed at the locked position. At this point, the second member 20 of the buckling mechanism of the present disclosure is effectively retained at the first member 10.

The present embodiment has multiple blocking mechanisms. During the locking process, the latch guiding slot 18 can restrict the movement of the second member 20, and the path guiding portion 12 and the first limiting plate 13 also can restrict the movement of the connection element. Therefore inappropriate forces applied during operation are prevented from causing ineffectiveness of the structure.

Figure 6A:
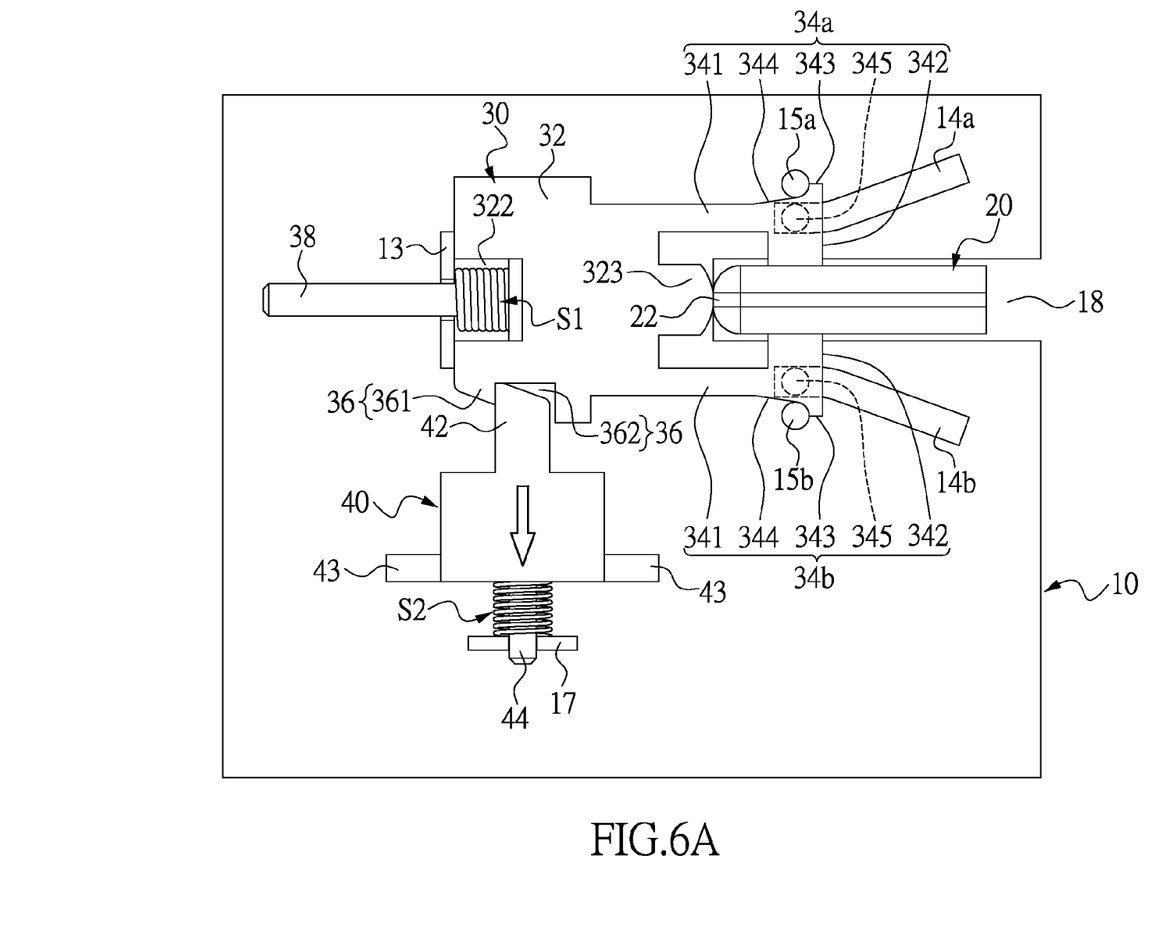
Figure 6B:
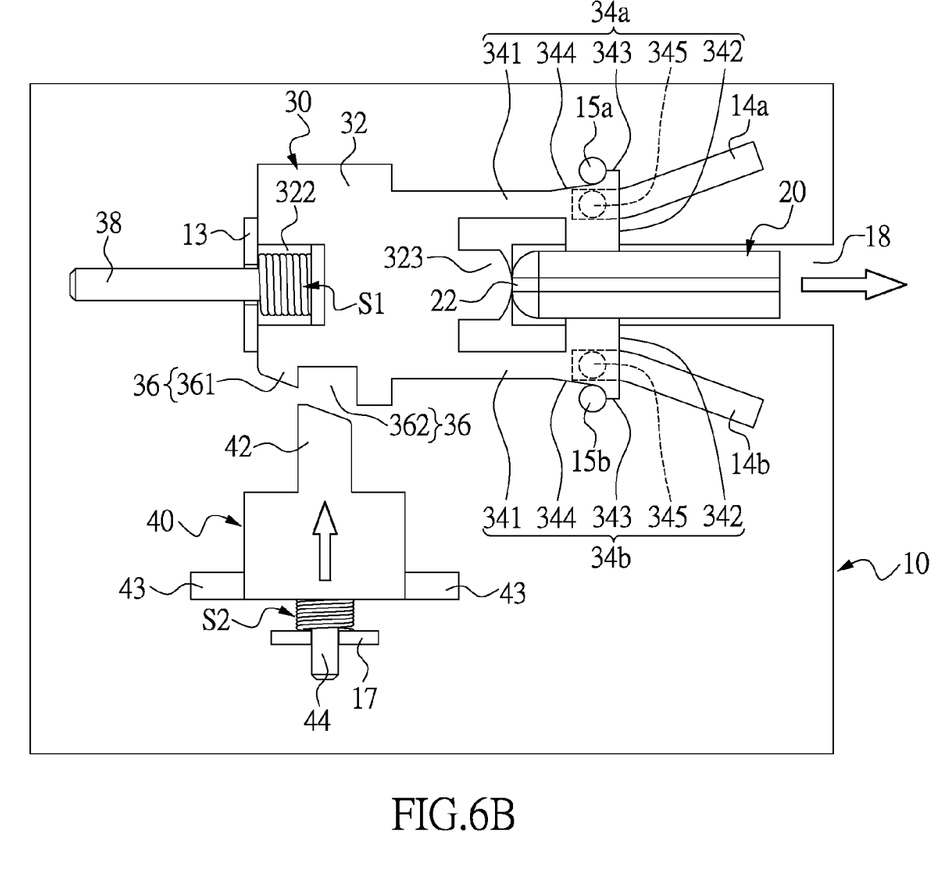
Figure 6C:
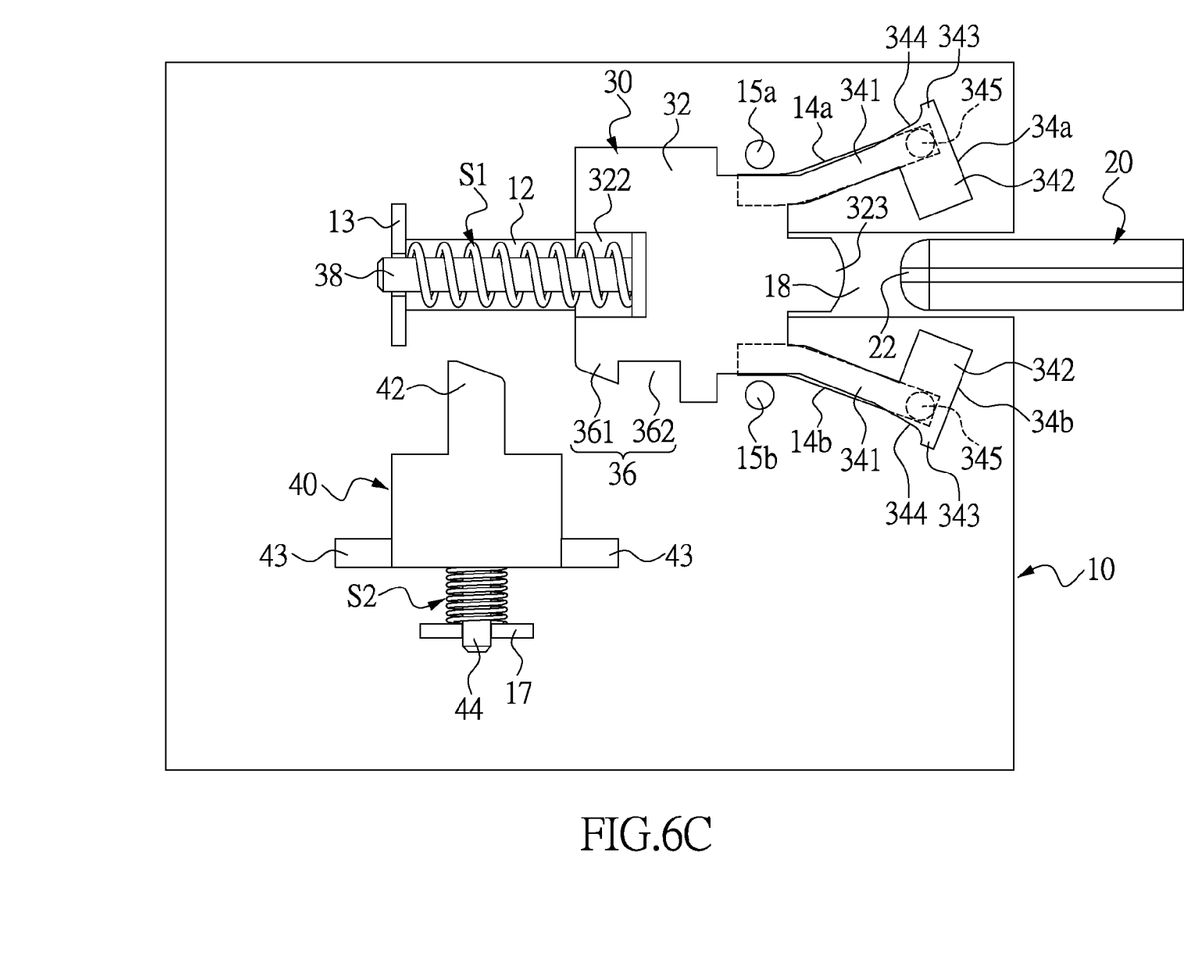

FIG. 6A to FIG. 6C show a buckling mechanism going from a locked state into an unlocked state. As shown in FIG. 6A, the buckling mechanism is in the locked state. When the user intends to undo the locked state, the blocking portion 42 of the interfering member 40 is first removed from the positioning groove 362 of the positioning portion 36.

As shown in FIG. 6B, in the present embodiment the holding portions 43 are prompted by the user to cause the interfering member 40 to move away from the positioning portion 36, thereby undoing the restriction on the connection element 30. Then, the elastic force provided by the first resilient element S1 pushes the connection element 30 outward, and the pushing block 323 of the main body 32 in turn pushes the second member 20 along the latch guiding slot 18 away from the first member 10. However, the present disclosure is not limited thereto. For example, the guiding rail 41 of the interfering member 40 can be prompted from the underside of the first member 10 and moved such that the interfering member 40 moves away from the positioning portion 36. In this embodiment, the guiding rail 41 can protrude from the underside of the first member, or a trigger unit connected to the guiding rail 41 can be disposed at the underside of the first member 10 for the user to prompt.

As shown in FIG. 6C, as the connection element 30 moves outward, the two locking arms 34a, 34b opens outward along the two locking-arm guiding portions 14a, 14b through the two guide protrusions 345. The two locking arms 34a, 34b are opened. When the first resilient element S1 is completely extended, the two guide protrusions 345 of the two locking arms 34a, 34b move the outward ends of the locking-arm guiding portions 14a, 14b. At this point, the second member 20 is withdrawn from the first member 10 and is at the unlocked state.

In the process of unlocking in the present embodiment, the user needs only prompt the holding portion 43 to undo the restriction on the connection element 30, in order for the second member 20 to automatically withdraw from the first member 10. The user does not need to manually withdraw the second member 20. The buckling mechanism has an auto-withdrawal function. During operation, the buckling mechanism can be clearly and definitely known to be in an open state. Conversely, when the second member 20 is pushed to the end, the two locking arms 34*a*, 34*b* contracts to a closed state. The two states are clearly indicated by the appearances without causing confusion or uncertainty.

The quantity of components is low and is sufficient to achieve the effects of locking and automatic ejection, and the structure is screw-less, saving the production cost. The assembly process is simplified.

Second Embodiment

Figure 7:
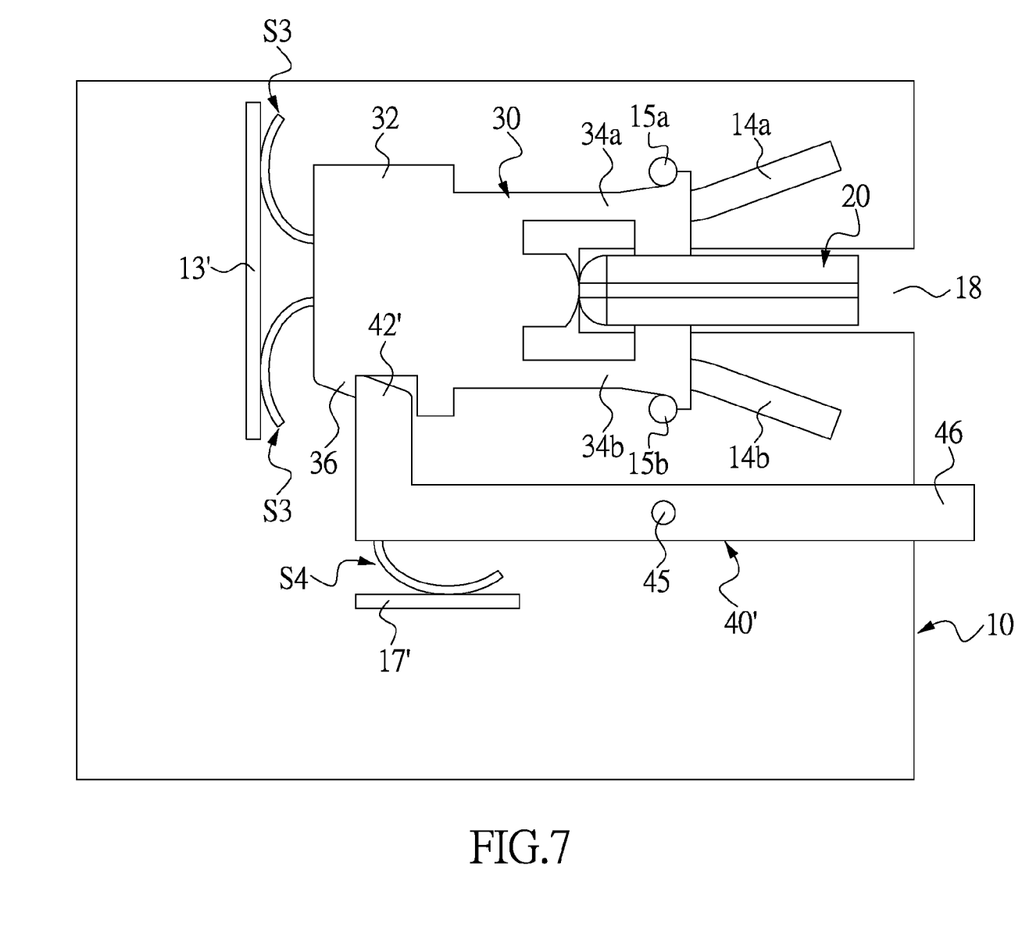
FIG. 7 shows a schematic diagram of a buckling mechanism according to another embodiment of the present disclosure.

FIG. 7 shows a schematic diagram of a buckling mechanism according to another embodiment of the present disclosure. The difference between the present embodiment and the previous embodiment lies in that the present embodiment has a first resilient element S3 integrally formed as one body with the connection element 30, and another type of interfering member 40'. The first resilient element S3 of the present embodiment is a pair of curved elastic plates extending from the main body 12. The first member 10 has a longer first limiting plate 13'. The curved elastic plates (S3) elastically abut the first limiting plate 13'.

The interfering member 40' is substantially L-shaped, and has a blocking portion 42' and a holding portion 46 bendingly extending from the blocking portion 42'. The middle portion of the holding portion 46 is rotatably disposed on the first member 10 along a pivot unit 45. The outer end of the blocking portion 42' is integrally formed as one piece with the second resilient element S4. The second resilient element S4 is a curved elastic plate extending from the interfering member 40. The first member 10 includes a second limiting plate 17'. The curved elastic plate elastically abuts the second limiting plate 17'. With proper positioning of the pivot unit 45, the holding portion 46 can have a longer moment arm, reducing the force required during unlocking.

The actuation of the present embodiment is similar to that of the previous embodiment. The difference lies in that during unlocking, the outer end of the holding portion 46 extends beyond the outer side of the first member 10, and the prompting position for the user is different. During unlocking, the outer end of the holding portion 46 is pushed toward the connection element 30, and the blocking portion 42' can move away from the positioning portion 36 of the connection element 30.

Based on the above description, the present disclosure can apply the buckling mechanism to any two structures which need to be closed upon each other, and form an article having a buckling mechanism, e.g. laptop casing, drawers, etc.

Figure 8:
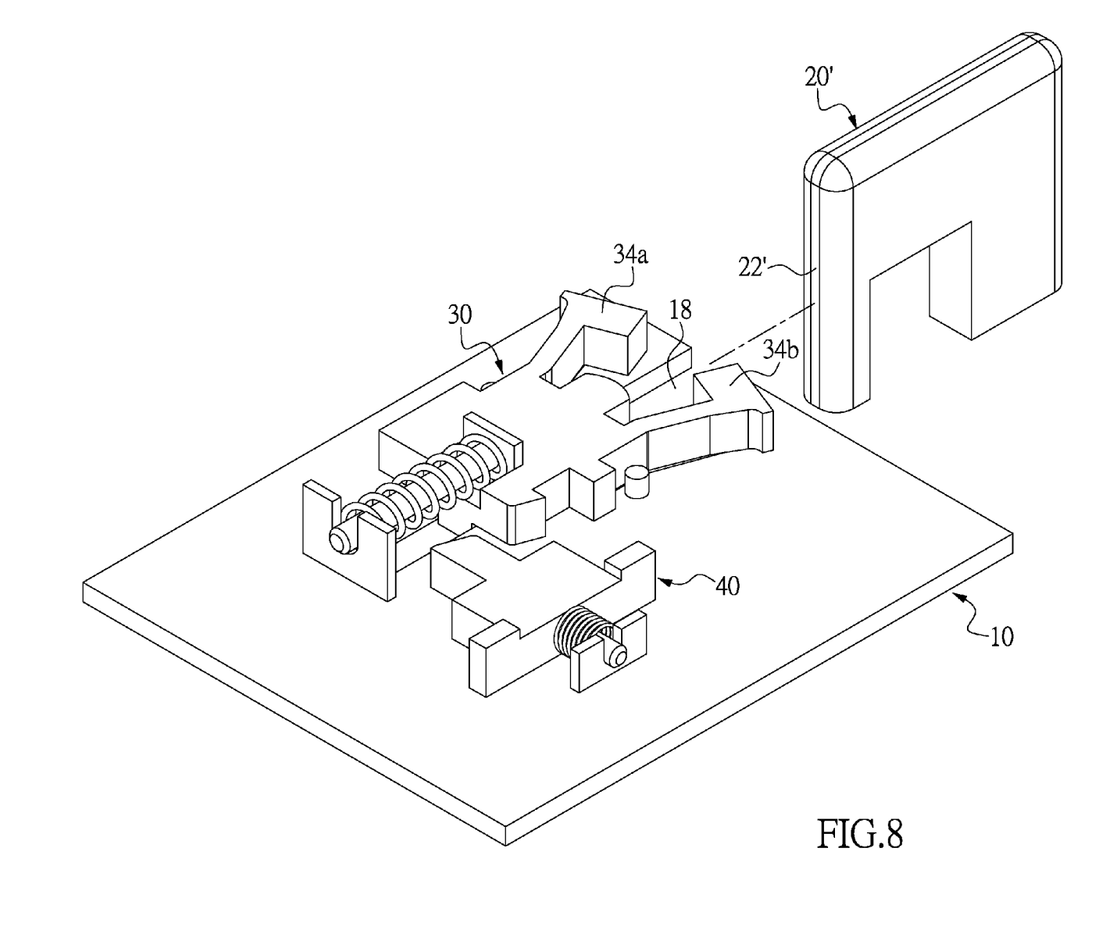
FIG. 8 shows a schematic diagram of a second member of a buckling mechanism according to another embodiment of the present disclosure.
Figure 9:
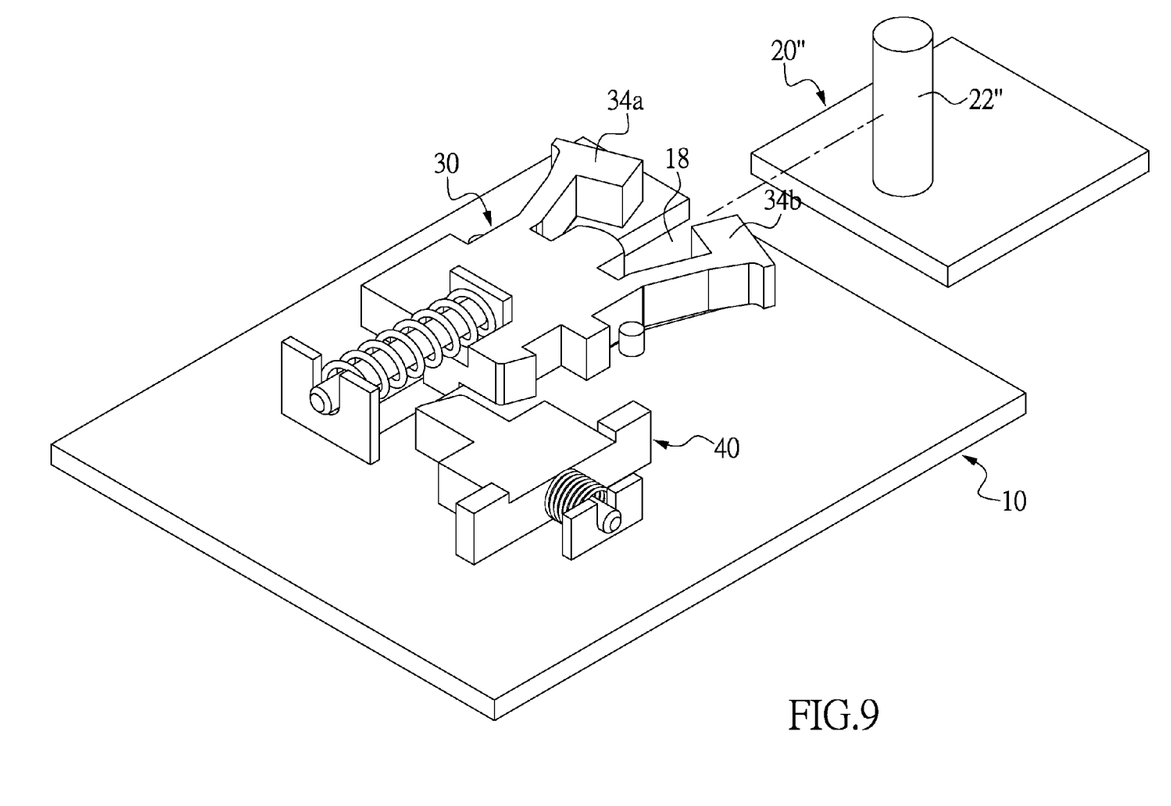
FIG. 9 shows a schematic diagram of a second member of a buckling mechanism according to yet another embodiment of the present disclosure.

Additionally, FIG. 8 and FIG. 9 show perspective view of the present disclosure having second members of different shapes. According to the above description, the present disclosure can have second members 20' of different appearances, such as the inverted-U-shaped shown in FIG. 8 having a latching member 22'. Additionally, as shown in FIG. 9, the second member 20" has a column-shaped latching member 22". Both of the above can be retained at the first member 10.

Possibly Effects of the Embodiments

In summary of the above, the present disclosure has the following advantages. The first member 10 provided by the present disclosure has multiple guiding mechanisms on a same plane, including guidance of the locking process, guidance of the automatic withdrawal, guidance of the positioning blocking, etc., which occupy limited volume. The assembly process does not require tools, and disassembly is simple, and the unlocking process is easy. Moreover, the two members of the present disclosure can be adjusted according to needs, e.g. adjusting the shape of the hook, buckle, locking lever, etc, to adapt to different articles.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A buckling mechanism, comprising:
a first member having two locking-arm guiding portions gradually approaching each other from an exterior edge of the first member inward;
a second member having a latching member; and
a locking assembly including:
a connection element having a main body slidably disposed on the first member along a line between the locking-arm guiding portions, and two flexible locking arms connected to the main body, the main body formed with a positioning portion, the two locking arms respectively slidably disposed along the two locking-arm guiding portions on the first member; wherein the connection element moves from an unlocked position to a locked position by pushing the latching member into the main body along the line, such that the two flexible locking arms slide along the locking-arm guiding portions toward the line and retain the latching member with respect to the first member;
a first resilient element configured to provide elastic force to bias the connection element along the line towards the unlocked position;
an interfering member movably mounted to the first member in a direction transverse to the line, and configured to engage the positioning portion when the connection element is at the locked position; and
a second resilient element configured to push bias the interfering member to a position for blocking maintaining the connection element in the locked position.

2. The buckling mechanism according to claim 1, wherein the first member is board-shaped, the two locking-arm guiding portions are grooves, the undersides of the two locking arms each have a locking-arm protrusion protruding therefrom, and the two locking-arm protrusions are respectively slidably disposed in the locking-arm guiding portions.

3. The buckling mechanism according to claim 2, wherein the first member further includes a path guiding portion formed along the line, and a guide protrusion protrudes from the main body of the connection element, wherein the guide protrusion is slidably disposed in the path guiding portion.

4. The buckling mechanism according to claim 3, wherein the first member further includes a latch guiding slot for guiding the second member, one end of the latch guiding slot opens at the exterior edge of the first member, and the latch guiding slot is arranged between the two locking-arm guiding portions.

5. The buckling mechanism according to claim 1, wherein the two flexible locking arms are L-shaped, each of the locking arms includes an arm portion connected to the main body and a hooking portion extending from the respective arm portion, and the L-shaped locking arms and the main body define a retaining space therebetween.

6. The buckling mechanism according to claim 5, further comprising two constricting columns disposed on the first member, wherein the two constricting columns are respectively arranged at outer sides of the two locking-arm guiding portions, each of the locking arms includes a stopping member formed at the outer side of the respective hooking portion and an oblique surface extending from the respective stopping member to the respective arm portion, and when the main body is at the locked position, the two constricting columns respectively abut the stopping members.

7. The buckling mechanism according to claim 1, wherein the connection element further includes a first guiding column, the first resilient element is a compression spring sleeving the first guiding column, the first member further includes a first limiting plate, the first guiding column is slidably disposed at the first limiting plate, and two ends of the first resilient element respectively abut the main body and the first limiting plate.

8. The buckling mechanism according to claim 1, wherein the positioning portion of the main body includes an inclined-face protrusion and a positioning groove adjacent to the inclined-face protrusion, the interfering member has a blocking portion, the blocking portion is formed with an inclined face configured to cooperate with the inclined-face protrusion, and when the main body is at the locked position, the blocking portion is entered into the positioning groove.

9. The buckling mechanism according to claim 8, wherein the interfering member has a second guiding column, the second resilient element is a compression spring sleeving the second guiding column, the first member further includes an interfering member guiding slot and a second limiting plate, the interfering member moves linearly along the interfering member guiding slot, the second guiding column is slidably disposed at the second limiting plate, and two ends of the second resilient element respectively abut the interfering member and the second limiting plate.

10. The buckling mechanism according to claim 9, wherein the locking-arm guiding portions pass through the first member or are recessed grooves on the first member.

11. The buckling mechanism according to claim 9, wherein the interfering member has at least one holding portion.

12. The buckling mechanism according to claim 1, wherein the first resilient element is at least one curved elastic plate integrally formed as one piece with the main body and extending from the main body, the first member further includes a first limiting plate, the curved elastic plate elastically abuts the first limiting plate.

13. The buckling mechanism according to claim 1, wherein the second resilient element is curved elastic plate integrally formed as one piece with the interfering member and extending from the interfering member, the first member includes a second limiting plate, and the curve elastic plate abuts the second limiting plate.

14. An article having a buckling mechanism, comprising:
a first member on a first portion of the article, and having two locking-arm guiding portions gradually approaching each other from an exterior edge of the first member inward;
a second member on a second portion of the article, and having a latching member; and
a locking assembly including:
a connection element having a main body slidably disposed on the first member along a line between the locking-arm guiding portions, and two flexible locking arms connected to the main body, the main body formed with a positioning portion, the two locking arms respectively slidably disposed along the two locking-arm guiding portions on the first member; wherein the connection element moves from an unlocked position to a locked position by pushing the latching member into the main body along the line, such that the two flexible locking arms slide along the locking-arm guiding portions toward the line and retain the latching member with respect to the first member;
a first resilient element configured to provide elastic force to bias the connection element along the line towards the unlocked position;
an interfering member movably mounted to the first member in a direction transverse to the line, and configured to engage the positioning portion when the connection element is at the locked position; and
a second resilient element configured to bias the interfering member to a position for maintaining the connection element in the locked position.

15. The article having a buckling mechanism according to claim 14, wherein the first member is board-shaped, the two locking-arm guiding portions are grooves, the undersides of the two locking arms each have a locking-arm protrusion protruding therefrom, and the two locking-arm protrusions are respectively slidably disposed in the locking-arm guiding portions.

16. The article having a buckling mechanism according to claim 15, wherein the first member further includes a path guiding portion formed along the line, and a guide protrusion protrudes from the main body of the connection element, wherein the guide protrusion is slidably disposed in the path guiding portion.

17. The article having a buckling mechanism according to claim 16, wherein the first member further includes a latch guiding slot for guiding the second member, one end of the latch guiding slot opens at the exterior edge of the first member, and the latch guiding slot is arranged between the two locking-arm guiding portions.

18. The article having a buckling mechanism according to claim 14, wherein the two flexible locking arms are L-shaped, each of the locking arms includes an arm portion connected to the main body and a hooking portion extending from the respective arm portion, and the L-shaped locking arms and the main body define a retaining space therebetween.

19. The article having a buckling mechanism according to claim 18, further comprising two constricting columns disposed on the first member, wherein the two constricting columns are respectively arranged at outer sides of the two locking-arm guiding portions, each of the locking arms includes a stopping member formed at the outer side of the respective hooking portion and an oblique surface extending from the respective stopping member to the respective arm portion, and when the main body is at the locked position, the two constricting columns respectively abut the stopping members.

* * * * *